(12) United States Patent
Hinkle (10) Patent No.: US 10,583,369 B2
(45) Date of Patent: Mar. 10, 2020

(54) PEEL AND STICK APPARATUSES FOR BUILDING BLOCKS, SYSTEMS AND METHODS OF USING THE SAME

(71) Applicant: Hinkle Direct, LLC, Spring Grove, IL (US)

(72) Inventor: Adam Hinkle, Prairie Grove, IL (US)

(*) Notice: Subject to any disclaimer, the term of this patent is extended or adjusted under 35 U.S.C. 154(b) by 0 days.

(21) Appl. No.: 15/713,243

(22) Filed: Sep. 22, 2017

(65) Prior Publication Data
US 2018/0099234 A1    Apr. 12, 2018

Related U.S. Application Data

(60) Provisional application No. 62/404,842, filed on Oct. 6, 2016.

(51) Int. Cl.
| | |
|---|---|
| *A63H 33/08* | (2006.01) |
| *A63H 33/14* | (2006.01) |
| *A47D 3/00* | (2006.01) |
| *F16B 47/00* | (2006.01) |
| *B65D 25/22* | (2006.01) |
| *A47D 15/00* | (2006.01) |
| *A47B 13/08* | (2006.01) |
| *A47B 88/483* | (2017.01) |
| *A47B 88/423* | (2017.01) |
| *F16B 11/00* | (2006.01) |

(52) U.S. Cl.
CPC ............... *A63H 33/14* (2013.01); *A47D 3/00* (2013.01); *A47D 15/00* (2013.01); *A63H 33/08* (2013.01); *A63H 33/086* (2013.01); *B65D 25/22* (2013.01); *F16B 47/003* (2013.01); *A47B 13/08* (2013.01); *A47B 88/423* (2017.01); *A47B 88/483* (2017.01); *A47B 2200/0001* (2013.01); *A47B 2200/0084* (2013.01); *A47B 2210/0062* (2013.01); *A47B 2210/09* (2013.01); *F16B 11/006* (2013.01)

(58) Field of Classification Search
CPC ........... A47B 97/001; A47F 5/08; A47G 1/17; A63H 33/04; A63H 33/08; A63H 33/086; A47K 10/10
See application file for complete search history.

(56) References Cited

U.S. PATENT DOCUMENTS

| | | | | |
|---|---|---|---|---|
| 2,805,777 A | * | 9/1957 | Larson | B25H 3/04 211/106.01 |
| 2,929,513 A | * | 3/1960 | Herzberg | A47K 10/10 211/106.01 |
| 3,191,777 A | * | 6/1965 | Willits, Jr. | A47F 5/0815 211/106.01 |
| 3,295,474 A | * | 1/1967 | Ornstein | A47B 57/46 108/152 |

(Continued)

*Primary Examiner* — John A Ricci
(74) *Attorney, Agent, or Firm* — Scherrer Patent & Trademark Law, P.C.; Stephen T. Scherrer; Monique A. Morneault (57) ABSTRACT

Peel-and-stick apparatuses for building blocks generally comprise peel-and-stick plates for disposing on surfaces, such as tables, walls, floors, or other like surfaces to provide surfaces whereby building blocks may be appended. Other embodiments of the present invention comprise peel-and-stick table drawers, peel-and-stick mount tubs, curved plates, and scored plates for easily breaking the same to change the sizes thereof. Systems and methods of using the same are further provided.

13 Claims, 6 Drawing Sheets

(56) References Cited

U.S. PATENT DOCUMENTS

| | | | | |
|---|---|---|---|---|
| 3,698,565 | A | * | 10/1972 | Weber .................... A47F 5/0025 |
| | | | | 211/126.15 |
| 4,382,106 | A | * | 5/1983 | Royster ..................... B32B 3/12 |
| | | | | 428/40.1 |
| D288,764 | S | * | 3/1987 | Moller ........................... D6/553 |
| 5,614,307 | A | * | 3/1997 | Andersen .............. B01F 3/1214 |
| | | | | 428/294.7 |
| 5,853,092 | A | * | 12/1998 | Goodman .............. A47F 5/0823 |
| | | | | 211/70.6 |
| 6,421,973 | B1 | * | 7/2002 | Gregg ....................... B28B 1/50 |
| | | | | 52/481.1 |

* cited by examiner

PEEL AND STICK APPARATUSES FOR BUILDING BLOCKS, SYSTEMS AND METHODS OF USING THE SAME

The present invention claims priority to U.S. Provisional Patent App. Ser. No. 62/404,842, titled "A SELF-ADHESIVE PLATE", filed Oct. 6, 2016, which is incorporated herein by reference in its entirety.

TECHNICAL FIELD

The present invention generally relates to peel and stick apparatuses for building blocks. Specifically, embodiments herein comprise peel-and-stick plates for disposing on surfaces, such as tables, walls, floors, or other like surfaces to provide surfaces whereby building blocks may be appended. Other embodiments of the present invention comprise peel-and-stick table drawers, peel-and-stick mount tubs, curved plates, and scored plates for easily breaking the same to change the sizes thereof. Systems and methods of using the same are further provided.

BACKGROUND

In today's time, entertainment has become the central focus of human life. Along with others, entertainment industry has derived significant development efforts in order to meet requirements for individual users, such as kids. There has been a considerable industrial effort to develop various devices and solutions to provide not only entertainment, but also educational experiences, to users.

One such entertainment and educational toy system relates to building blocks that are engageable to or otherwise mountable with each other, thereby allowing users to build larger items using the blocks. These building blocks comprise, generally, at least one surface having protrusions or pips and at least one surface comprising apertures, depressions or crevices, whereby protrusions or pips of one building block engage and are frictionally held within the apertures, depressions or crevices of a second building block. An example of such building blocks is known as LEGO® building blocks.

Building blocks, as described herein, may be utilized to build larger structures. Often, the building blocks can be disposed on a plate or surface having a plurality of protrusions on one flat surface thereof where a user can build the structure from the smaller building blocks. It is also generally known to adhere these plates to surfaces for utilizing with the building blocks. Specifically, it is known to take a plate, apply an adhesive and disposed directly on a surface, such as a wall or a table top.

Adhering plates on walls, tabletops or other like surfaces can be messy and difficult. Oftentimes, the adhesive is difficult to manage and control. Further, it is often difficult to provide a sufficient amount of adhesive thereon, or to provide sufficient coverage of the adhesive to a back surface of the plates or to the surface to which the plate adheres. A need, therefore exists for building blocks mounting plates having an adhesive present thereon that is evenly covered and significantly easier to use than applying liquid adhesive thereon. Moreover, a need exists for building blocks mounting plates providing strong and dependable adhesion to both the mounting plate and the surface to which the plate is mounted.

Another option is to utilize double-sided tape to adhere mounting plates to surfaces. However, double sided tape does not provide significant adherence to the mounting surfaces of the mounting plates because double-sided tape does not flow and fill crevices and grooves in the same manner as an adhesive would. Thus, a need exists for building blocks mounting plates having an adhesive that flows and fills crevices and grooves within a building blocks mounting plate mounting surface. Specifically, a need exists for building blocks mounting plates that provide side-to-side full coverage of the mounting plates mounting surface to provide better adhesion of the same to the surfaces.

Ancillary objects may further be utilized for aiding in providing storage solutions for the building blocks. Typically, building blocks are stored in bins or boxes that may be kept separate from mounting plates that may be disposed on surfaces, such as walls and/or tables. A need exists for a sliding drawer disposed beneath a surface, wherein the surface comprises mounting plates thereon and wherein the sliding drawer rails are adhesively mounted to an underside of the table and the drawer is slidable to easily retrieve the building blocks therein. Moreover, a need exists for a tub or bucket that may be adhesively held to a wall in close proximity, such as beneath, vertically mounted mounting plates for storing building blocks therein.

Building blocks mounting plates typically come in one of several limited sizes. When creating a surface comprising a large number of mounting plates, the mounting plates are typically disposed side-by-side. However, the particular size of mounting plate may be not be available for fitting a particular space. For example, a table top may have a particular size dimension. However, mounting plates may come in limited sizes so that the full surfaces of the table top may not be fully utilized, or may create overhang over mounting plates over the terminal edges of the table top. A need, therefore, exists for building blocks mounting plates having scores therein for allowing an individual to break down larger mounting plates into smaller pieces thereof. More particularly, a need exists for building blocks mounting plates that may be broken down into smaller pieces to fit space on a table top or a wall without spilling into areas outside desired boundaries.

SUMMARY OF THE INVENTION

The present invention generally relates to peel and stick apparatuses for building blocks. Specifically, embodiments herein comprise peel-and-stick plates for disposing on surfaces, such as tables, walls, floors, or other like surfaces to provide surfaces whereby building blocks may be appended. Other embodiments of the present invention comprise peel-and-stick table drawers, peel-and-stick mount tubs, curved plates, and scored plates for easily breaking the same to change the sizes thereof. Systems and methods of using the same are further provided.

To this end, in an embodiment of the present invention, a building blocks mounting plate is provided. The building blocks mounting plate comprises: a first surface on a first side of the mounting plate comprising a plurality of protrusions thereon for mounting building blocks thereon; a second surface on a second side of the mounting plate comprising a surface texture comprising crevices; an adhesive disposed on the second surface of the mounting plate, wherein the adhesive is applied as a flowable material onto the second surface and disposed within the crevices of the second surface; and a peelable cover disposed on the adhesive, wherein removal of the peelable cover exposes the adhesive for adherence thereon to a surface.

In an embodiment, the crevices on the second surface correspond in location to the plurality of protrusions on the first surface.

In an embodiment, the peelable cover is selected from the group consisting of film and paper.

In an embodiment, the building blocks mounting plate further comprises: at least one score line in the mounting plate wherein the score line is breakable upon a sufficient force to separate the mounting plate into a first section and a second section.

In an embodiment, a system comprising the building blocks mounting plate is provided. The system comprises: a surface; and the building blocks mounting plate of claim 1 adhered to the surface via the adhesive after removal of the peelable cover.

In an embodiment, the system further comprises: a table comprising a tabletop having the surface as an upper surface thereof and a lower surface on an underside of the tabletop; a pair of rails disposed parallel to each other, wherein the rails are adhered to the lower surface on the underside of the tabletop; and a drawer having flanges on opposite sides thereof, wherein the flanges are slidably disposed within the pair of rails, respectively.

In an embodiment, the drawer is a bucket.

In an embodiment, a method of using the building blocks mounting plate is provided. The method comprises the steps of: peeling the cover from the adhesive on the second surface; and pressing the adhesive to a surface adhering the adhesive to the surface.

In an alternate embodiment of the present invention, a bucket for holding items therein is provided. The bucket comprises: a storage area and a plurality of sides, wherein a first side comprises a first top edge and a first flange on the first top edge thereof, wherein a second side comprises a second top edge and a second flange on the second top edge thereof; a first rail on the first flange having a flat top surface; a second rail on the second flange having a flat top surface; a first adhesive on the flat top surface of the first rail, wherein the first adhesive comprises a first peelable cover; and a second adhesive on the flat top surface of the second rail, wherein the second adhesive comprises a second peelable cover.

In an embodiment, the first rail runs at least the length of the first flange and the second rail runs at least the length of the second flange.

In an embodiment, the adhesive is a pressure sensitive adhesive.

In an embodiment, the peelable cover is selected from the group consisting of film and paper.

In an alternate embodiment of the present invention, a system for holding building blocks is provided. The system comprises: a vertical surface; at least one building blocks mounting plate comprising a plurality of protrusions for mounting building blocks thereto, wherein the building blocks mounting plate is adhered to the vertical surface; a storage receptacle having a storage area and a back surface, wherein the back surface comprises an adhesive thereon, wherein the back surface of the storage receptacle is adhered to the vertical surface in close proximity to the at least one building blocks mounting plate.

In an embodiment, the storage receptacle comprises a front side and a back side, wherein the back surface is on the back side thereof.

In an embodiment, the storage area is hemispherical due to the front side being round and the back side being flat.

In an embodiment, the storage receptacle is a bucket.

In an embodiment, the storage receptacle is disposed beneath the at least one building blocks mounting plate.

In an embodiment, the system comprises: a plurality of building blocks mounting plates disposed adjacent each other.

In an embodiment, the storage receptacle comprises a plurality of building blocks for mounting on the building blocks mounting plate.

In an embodiment, the at least one building blocks mounting plate comprises: a first surface on a first side of the mounting plate comprising a plurality of protrusions thereon for mounting building blocks thereon; a second surface on a second side of the mounting plate comprising a surface texture comprising crevices; and an adhesive disposed on the second surface of the mounting plate, wherein the adhesive is applied as a flowable material onto the second surface and disposed within the crevices of the second surface, wherein the adhesive adheres the mounting plate to the vertical surface.

It is, therefore, an advantage and objective of the present invention to provide building blocks mounting plates having an adhesive present thereon that is evenly covered and significantly easier to use than applying liquid adhesive thereon.

Moreover, it is an advantage and objective of the present invention to provide building blocks mounting plates providing strong and dependable adhesion to both the mounting plate and the surface to which the plate is mounted.

In addition, it is an advantage and objective of the present invention to provide building blocks mounting plates having an adhesive that flows and fills crevices and grooves within a building blocks mounting plate mounting surface.

Specifically, it is an advantage and objective of the present invention to provide building blocks mounting plates that provides side-to-side full coverage of the mounting plates mounting surface to provide better adhesion of the same to the surfaces.

Further, it is an advantage and objective of the present invention to provide a sliding drawer apparatus disposed beneath a surface comprising mounting plates thereon wherein the sliding drawer is adhesively mounted to an underside of the table and slidable to easily retrieve the building blocks therein.

Still further, it is an advantage and objective of the present invention to provide a tub or bucket that may be adhesively held to a wall in close proximity, such as beneath, vertically mounted mounting plates for storing building blocks therein.

Moreover, it is an advantage and objective of the present invention to provide building blocks mounting plates having scores therein for allowing an individual to break down larger mounting plates into smaller pieces thereof.

More particularly, it is an advantage and objective of the present invention to provide building blocks mounting plates that may be broken down into smaller pieces to fit space on a table top or a wall without spilling into areas outside desired boundaries.

Additional features and advantages of the present invention are described in, and will be apparent from, the detailed description of the presently preferred embodiments and from the drawings.

BRIEF DESCRIPTION OF THE DRAWINGS

The drawing figures depict one or more implementations in accord with the present concepts, by way of example only, not by way of limitations. In the figures, like reference numerals refer to the same or similar elements.

DETAILED DESCRIPTION OF THE PRESENTLY PREFERRED EMBODIMENTS

In the following detailed description of the embodiments of the present subject matter, references are made to the accompanying drawings that form a part hereof, and in which are shown by way of illustration specific embodiments in which the present subject matter may be practices. These embodiments are described in sufficient detail to enable those skilled in the art to practice the present subject matter, and it is to be understood that other embodiments may be utilized and that changes may be made without departing from the scope of the present subject matter. The following detailed description is, therefore, not to be taken in a limiting sense, and the scope of the present subject matter is defined by the appended claims.

Some embodiments, illustrates its features, will now be discussed in detail. The word "comprising," "having," "containing," and "including," and other forms thereof, are intended to be equivalent in meaning and be open-ended in that an item or items following any own of these words is not meant to be an exhaustive listing of such item or items, or meant to be limited to only the listed item or items. It must also be noted that us used herein and in the appended claims, the singular forms "a," "an," and "the" include plural references unless the context clearly dictates otherwise. Although any methods, and systems similar or equivalent to those described herein can be used in the practice or testing of embodiments, the preferred methods, and systems are now described. The disclosed embodiments are merely exemplary.

In an embodiment, a peel-and-stick self-adhesive plate 100 is provided. The plate 100 generally comprises a pressure-sensitive adhesive disposed on a mounting surface thereof, to which the mounting surface may be adhered to various surfaces, such as a wall so that the plate is disposed vertically, a tabletop such that the plate is disposed horizontally, a floor, a ceiling, or any other like surface apparent to one of ordinary skill in the art. The pressure-sensitive adhesive may be applied to the mounting surface of the plate in a flowable form so that the pressure-sensitive adhesive may flow into crevices, grooves, holes, apertures, or other like elements to provide a substantial and dependable adhesion to the mounting plate. Moreover, the pressure-sensitive adhesive may be specifically tailored to adhere to thermoplastics because typical building blocks mounting plates are made from thermoplastics.

Figure 1:
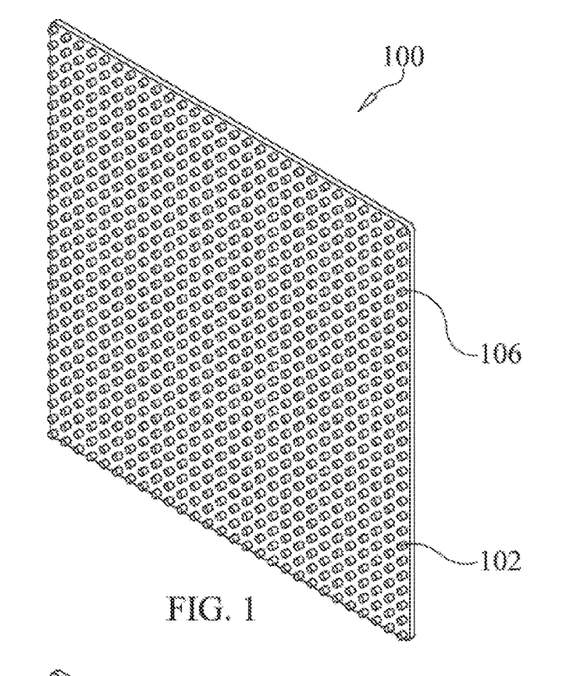
FIG. 1 illustrates an upper view of a peel-and-stick self-adhesive plate, in accordance with an embodiment of the present invention.
Figure 2:
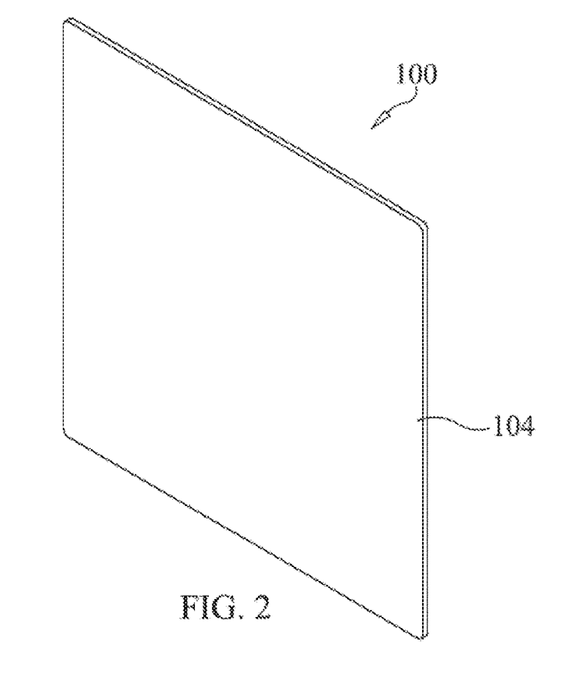
FIG. 2 illustrates a lower view of a peel-and-stick self-adhesive plate in accordance with an embodiment of the present invention.
Figure 3:
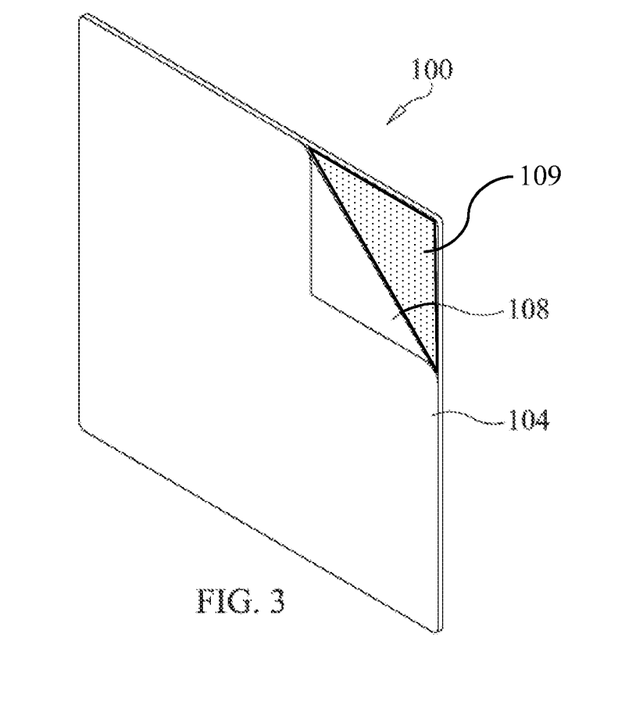
FIG. 3 illustrates a lower view of a peel-and-stick self-adhesive plate in accordance with an embodiment of the present invention.
Figure 4:
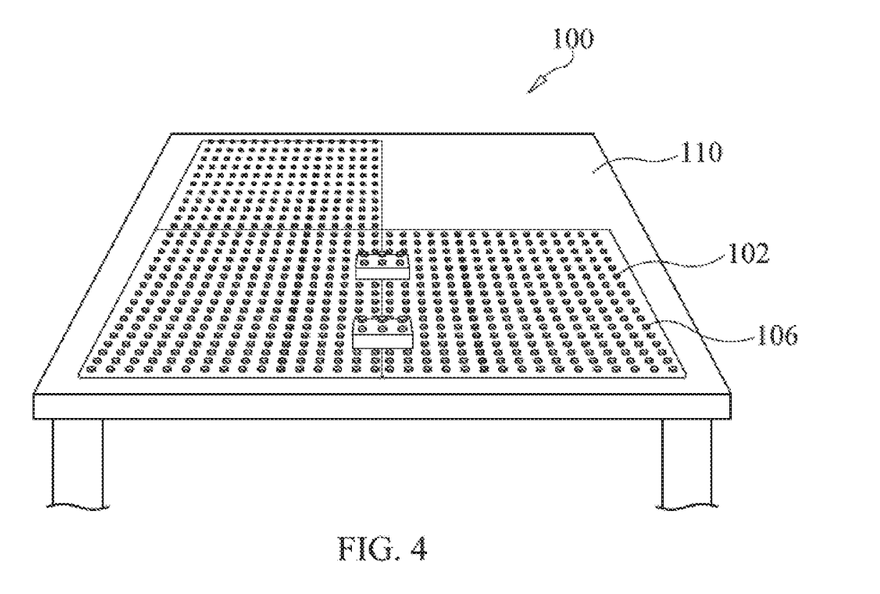
FIG. 4 illustrates a perspective view of a plurality of peel-and-stick self-adhesive plates disposed on a table top in accordance with an embodiment of the present invention.

Referring to FIGS. 1, 2, 3 and 4 collectively, FIG. 1 illustrates an upper view of a peel-and-stock self-adhesive plate 100; FIGS. 2 and 3 illustrate embodiments of a lower view thereof; and FIG. 4 illustrates a plurality of plates 100 adhered to a tabletop in an embodiment of the present invention.

The self-adhesive plate 100, as illustrated in FIG. 1, may comprise an upper surface 102 and a lower surface 104. The upper surface 102 of the plate 100 may be manufactured from ABS plastic, although the present invention should not be limiting as described herein. The plate 100 may be injection molded with a plurality of protrusions 106 thereon. The plurality of protrusions 106 on the upper surface 102 of the plate 100 may support various toys, such as building blocks of different sizes. The plate 100 may enable users to create an instant play area on any hard surface, such as, but not limited to, walls, boxes, tabletops, floors, ceilings, or any other like surfaces. Specifically, a plurality of plates 100 may be utilized for such a purpose, as illustrated in FIG. 4.

In an embodiment of the present invention, the lower surface 104 of the plate 100 may further have an adhesive layer 109 and a peel-off backing 108. The lower surface 104 of the plate 100 may preferably be a layer of thick acrylic foam adhesive so as to handle textured surfaces. Specifically, the adhesive may be applied to the lower surface 104 in a flowable liquid state so that the adhesive may fill crevices, gaps, grooves, and other like areas. The adhesive thickness can vary between 0.4 mm and 3 mm, although it should be noted that the adhesive may be an thickness apparent to one of ordinary skill in the art and the present invention should not be limited as described herein. The adhesive may be selected from the group consisting of EPDM, PVC, polyethylene, PVC/nitrile, and combinations thereof.

The plurality of plates 100 may be utilized to create an instant play area on any hard surface, wherein the adhesive on the lower surface 104 may adhere to the tabletop of the table 110 or on any like surfaces to create the instant play area. Specifically, the peel-off backing may be peeled, thereby exposing the adhesive therebeneath, as illustrated in FIG. 3. The peel-off backing may protect the adhesive layer on the lower surface 104, which may be peeled right before installation thereof onto a surface.

Although foam adhesive is preferably, it should be noted that the adhesive may be different than foam adhesive, and may be include solid adhesive (applied in liquid form to be held within grooves, gaps and the like).

In an alternate embodiment of the present invention, the plate 100 may be manufactured and used in different sizes with different thicknesses of foam adhesive on the lower surface 104 thereof. The different sizes of the plates 100 may be any commonly known, including but not limited to 10"×10" (32×32 stud), 5"×5" (16×16 stud), 15"×15" (48 stud×48 stud), 7.5"×7.5" (24×24 stud) or any combination of these sizes.

Moreover, the plates 100 of the present invention, or other plates disclosed herein, may be covered completely by protrusions 106, or may be only partially covered by protrusions. For example, building blocks mounting plates may comprise smooth areas that may represent areas such as roadways, ponds, rivers, or other like features, that may be devoid of protrusions. The present invention is meant to cover building blocks mounting plates of any configuration of protrusions thereon, or any color scheme as apparent to one of ordinary skill in the art.

Figure 5:
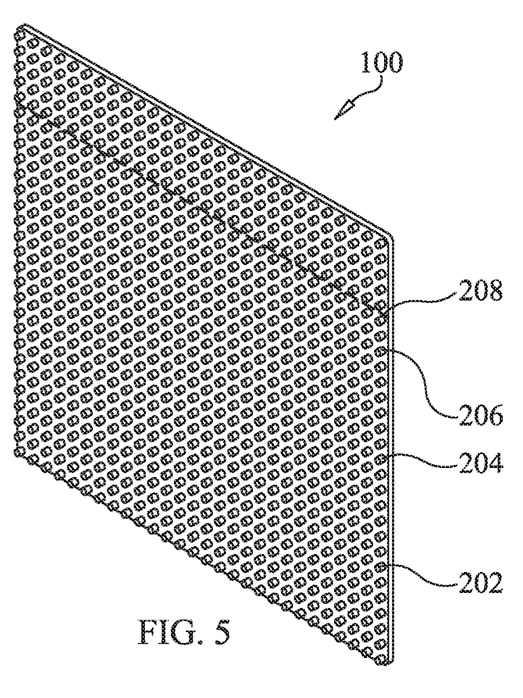
FIG. 5 illustrates an upper view of a peel-and-stick self-adhesive plate comprising a score line in an embodiment of the present invention.

In yet another alternate embodiment of the present invention, a building blocks mounting plate 200 of the present invention may comprise an upper surface 202, a lower surface 204, and a plurality of protrusions 206 thereon. Moreover, the plate 200 may further comprise one or more score lines 208 disposed in the top surface and/or the bottom surface, thereby allowing a user to break the mounting plate 200 into smaller pieces so as to fit mounting surfaces better. The score line 208 may be a line of weakness within the plate 200 allowing a user to break the same into a smaller piece. The line of weakness may be scored via a knife, laser or other like element. Moreover, the score line may comprise a plurality of small holes or apertures thereby allowing easy separation of the mounting plate into its smaller components.

In use, the score line 208 may be broken by a user by gripping ends of the plate 200 on opposite sides of the score line 208 and bending until the score line breaks, thereby creating a smaller mounting plate as needed. As noted above, a plurality of score lines may be provided on a single mounting plate, and one of the plurality of score lines may be selected and broken as described above, as necessary for the particular location or size restrictions needed for the mounting plate on a surface.

Figure 6:
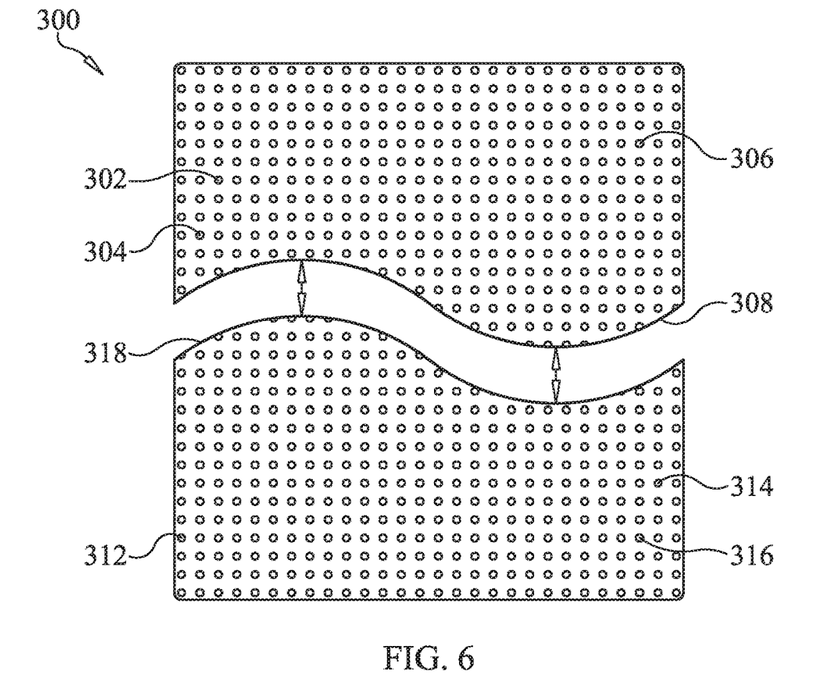
FIG. 6 illustrates an upper view of a bifurcated sectional mounting plate having curved aligned edges in an embodiment of the present invention.

FIG. 6 illustrates a further embodiment of the present invention of a bifurcated sectional mounting plate 300 comprising a first plate section 302 having an upper surface 304 and a lower surface (not shown), and further having a plurality of protrusions 306 thereon for mounting building blocks thereon. Further, the first plate section 302 comprises a first curved edge 308 represented by a sine wave pattern, as illustrated in FIG. 6. Mounting plate 300 further comprises second plate section 312 having an upper surface 314 and a lower surface (not shown), and further having a plurality of protrusions 316 thereon for mounting building blocks thereon. The second plate section 312 comprises a second curved edge 318, also represented by a sine wave pattern in FIG. 6. In a preferred embodiment, the first curved edge 308 and the second curved edge 318 align together when pushed in contact with each other (as illustrated by arrows in FIG. 6), such that the first and second plate section 302, 312 form mounting plate 300 without breaks or gaps between the first and second plate sections 302, 312. Thus, first plate section 302 may be colored differently from second plate section 312 so that the first and second plate sections 302, 312 may represent different aspects of a landscape. For example, the first plate section 302 may be colored blue to represent a body of water and the second plate section 312 may colored green to represent land adjacent the body of water.

Although the first and second plate sections have first and second curved edges 308, 318 shown as a curved sine wave, it should be noted that the first and second curved edges 308, 318 may have other curved shapes so long as the first and second curved edges 308, 318 align together to form a full mounting plate 300 without breaks or gaps therebetween the first and second curved edges 308, 318.

Figure 7:
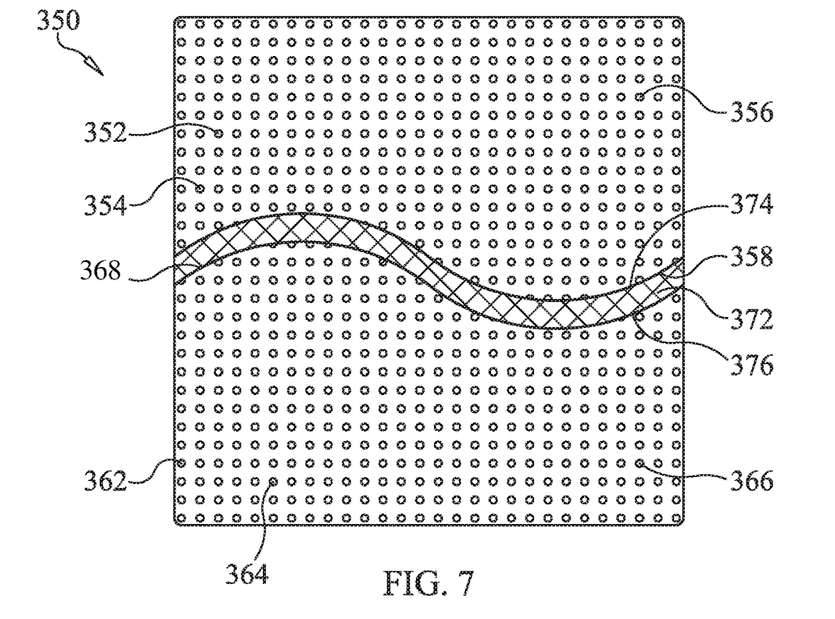
FIG. 7 illustrates an upper view of a sectional mounting plate having curved edges and a curved edge midsection in an embodiment of the present invention.

FIG. 7 represents an alternate embodiment of a sectional mounting plate 350 comprising a first plate section 352 having an upper surface 354 and a lower surface (not shown), and further having a plurality of protrusions 356 thereon for mounting building blocks thereon. Further, the first plate section 352 comprises a first curved edge 358 represented by a sine wave pattern, as illustrated in FIG. 7. Sectional mounting plate 350 further comprises second plate section 362 having an upper surface 364 and a lower surface (not shown), and further having a plurality of protrusions 366 thereon for mounting building blocks thereon. The second plate section 362 comprises a second curved edge 368, also represented by a sine wave pattern in FIG. 7. Between the first and second plate sections 352, 362 may be a mid-section plate 372 having a first curved edge 374 and a second curved edge 376.

The first curved edge 374 of the mid-section plate 372 aligns with first curved edge 358 on the first plate section 352, whereas the second curved edge 376 of the mid-section plate 372 aligns with second curved edge 368 on the second plate section 362. The mid-section plate 372 may have a plurality of protrusions thereon for mounting building blocks thereon, or may be smooth without protrusions. Thus, the mid-section plate 372 may represent a different landscape feature, or any other feature, compared to the first and second plate sections 352, 362. For example, mid-section plate 372 may be colored blue, and may represent a river, whereas first and second plate sections 352, 362 may be colored green to represent land so that when first plate section 352, mid-section 372, and second plate section 362 are aligned together, the full sectional mounting plate 350 is formed without breaks or gaps between the first plate section 352, mid-section 372, and second plate section 362 as illustrated in FIG. 7.

The first and second curved edges 358, 368 of the first and second plate sections 352, 362, respectively, and the first and second curved edges 374, 376 of the mid-section plate 372, are shown and represented in FIG. 7 as a curved sine wave, but it should be noted that the curved edges may be any shape so long as the curved edges thereof align together without breaks or gaps to form full sectional mounting plate 350.

Figure 8:
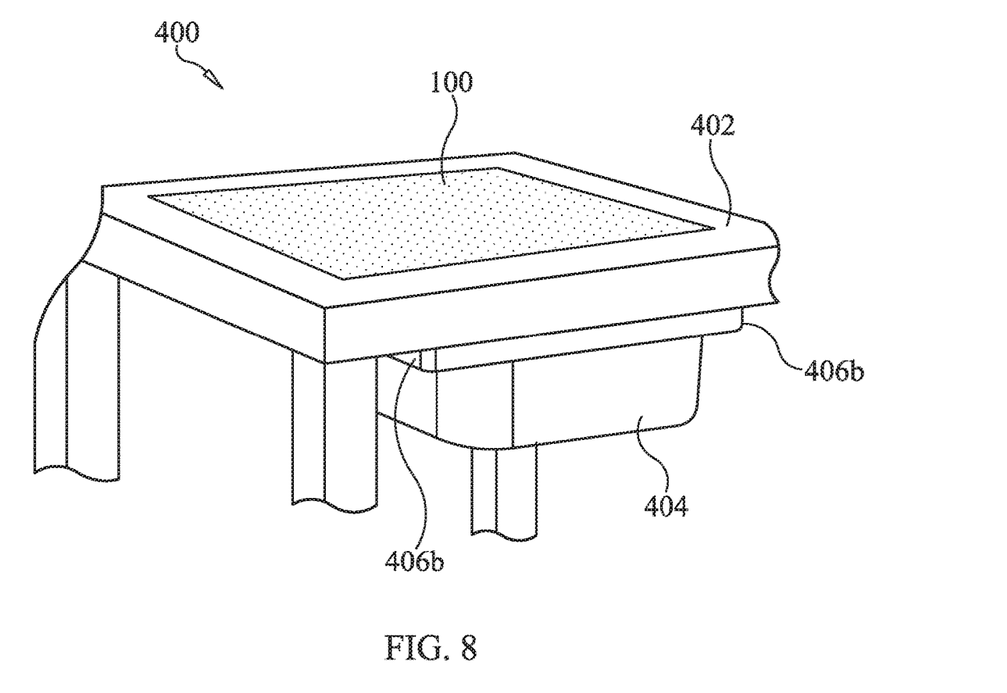
FIG. 8 illustrates a perspective view of a table having a tabletop surface with building blocks mounting plates disposed thereon and a slidable drawer therebeneath in the an embodiment of the present invention.
Figure 9:
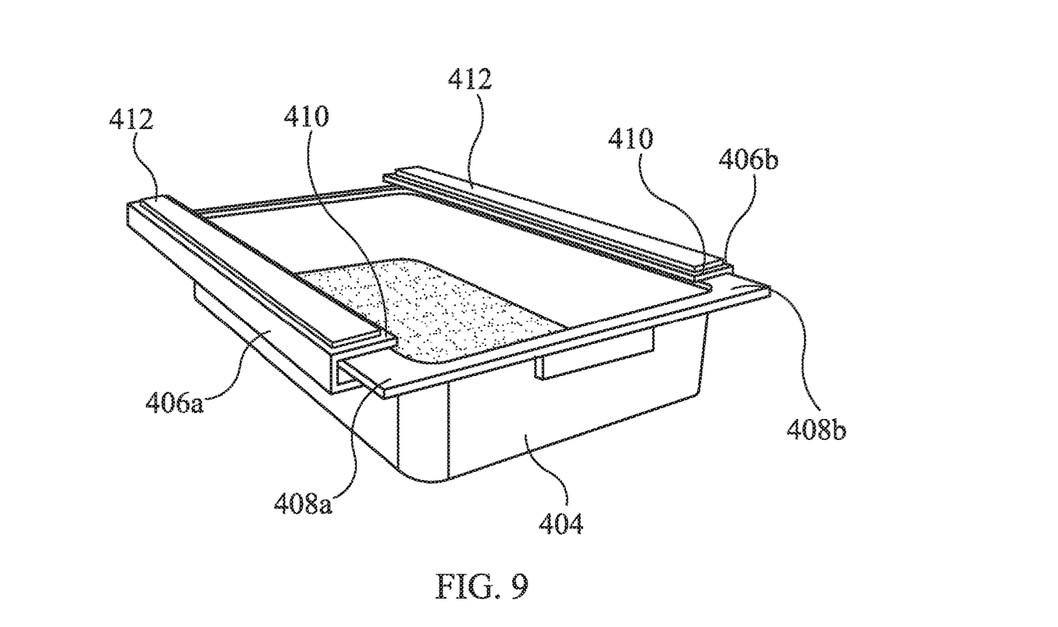
FIG. 9 illustrates an upper view of a slidable drawer in an embodiment of the present invention.

In an alternate embodiment of the present invention illustrated in FIG. 8, a table 400 is illustrated comprising a table top 402 comprising one or a plurality of building blocks mounting plates 100 disposed thereon. Disposed beneath the table top 402 may be a drawer 404 on rails 406a, 406b. The drawer 404 may preferably be in the form of a bucket, and may be utilized to store building blocks therein without spilling the same out of sides thereof. The rails 406a, 406b may hold flanges 408a, 408b on the drawer 404 and allow the flanges 408a, 408b and thus the drawer 404 to slide. In a preferred embodiment, as illustrated in FIG. 9, a peel-and-stick adhesive 410 may be disposed on a top surface of the rails 406a, 406b.

Specifically, the drawer 404 may have the rails 406a, 406b disposed on the flanges 408a, 408b of the drawer 404, with an adhesive 410 disposed on a top surface of each rail 406a, 406b and removable protective film or paper (not shown) thereon. The rails 406a, 406b may be J-channels having a top surface with the adhesive thereon. For applying the drawer 404 beneath the tabletop 402, the removable protective film or paper may be removed exposing the adhesive 410 thereunder, and the drawer and rails 406a, 406b may be placed on an underside of the tabletop 402 and pressed thereon. The adhesive comprises sufficient adhesion to hold the drawer 404 thereunder without removing the same, and the drawer 404 may easily slide in through the rails 406a, 406b to pull the drawer 404 out from under the tabletop 402 for access to the storage space within the drawer 404. The rails 406a, 406b may further comprise apertures for additional screws or pins to hold the rails 406a, 406b to the underside of the tabletop 402.

Figures 10, 11:
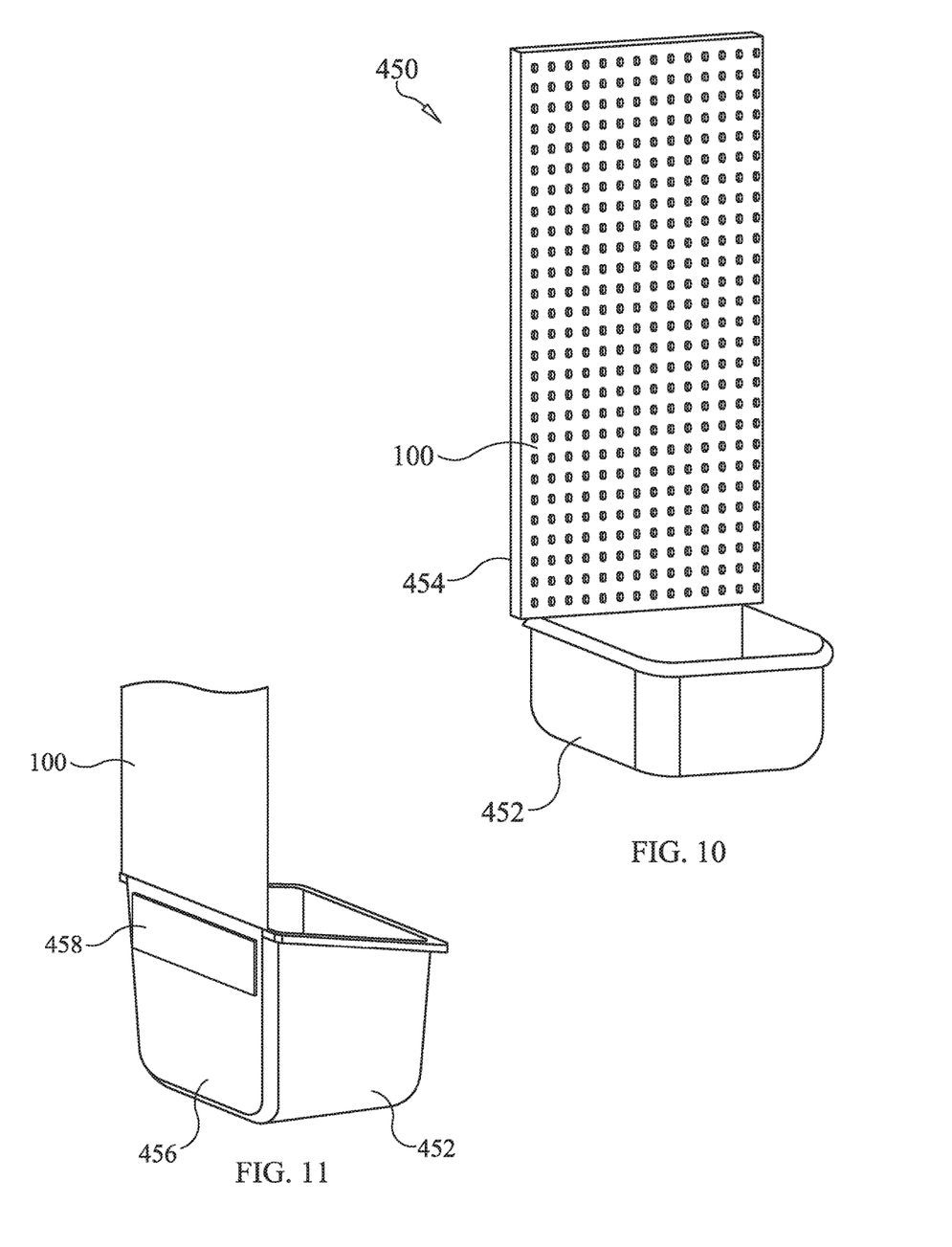
FIG. 10 illustrates a perspective view of a vertical surface having at least one building blocks mounting plate thereon and a storage bucket disposed on the vertical surface in an embodiment of the present invention.
FIG. 11 illustrates a rear view of a storage bucket in an embodiment of the present invention.

In an alternate embodiment, a building blocks bucket and mounting surface system 450 is illustrated in FIG. 10. A building blocks bucket 452 may be placed and adhered against a vertical surface 454 such as a wall, for example, with one or a plurality of building blocks mounting plates 100 (or any other mounting plates disclosed herein) mounted and adhered above the bucket 452. The bucket 452 may comprise a flat rear surface 456 and an adhesive 458 disposed thereon for adhering the bucket 452 to the vertical surface 454. The adhesive 458 may be placed on only a portion of the rear surface 456 as, for example, a strip as illustrated in FIG. 11, or, alternatively, may be placed over the entirety of the rear surface 456. The adhesive may have sufficient strength and adhesion to hold the bucket 452 on the vertical surface without falling or peeling off of the vertical surface 454.

As shown in FIGS. 10 and 11, the bucket 452 may preferably be semi-cylindrical in shape, with the flat rear surface 456 and a generally flat front surface 460 and a curved bottom surface 462 that runs into side surfaces thereof It should be noted that various changes and modifications to the presently preferred embodiments described herein will be apparent to those skilled in the art. Such changes and modifications may be made without departing from the spirit and scope of the present invention and without diminishing its attendant advantages. Further, references throughout the specification to "the invention" are nonlimiting, and it should be noted that claim limitations presented herein are not meant to describe the invention as a whole. Moreover, the invention illustratively disclosed herein suitably may be practiced in the absence of any element which is not specifically disclosed herein.

I claim:

1. A building blocks mounting plate comprising:
   a first surface on a first side of the mounting plate comprising a first plurality of protrusions thereon configured to mount building blocks thereon, wherein the building blocks comprise first crevices on at least one side thereof configured to mount between at least two of the first plurality of protrusions on the mounting plate;
   a second surface on a second side of the mounting plate comprising a surface texture comprising second crevices;
   an adhesive disposed on the second surface of the mounting plate, wherein the adhesive is applied as a flowable material onto the second surface and disposed within the crevices of the second surface; and
   a peelable cover disposed on the adhesive, wherein removal of the peelable cover exposes the adhesive for adherence thereon to a surface.

2. The building blocks mounting plate of claim 1 wherein the second crevices on the second surface correspond in location to the first plurality of protrusions on the first surface.

3. The building blocks mounting plate of claim 1 wherein the peelable cover is selected from the group consisting of film and paper.

4. The building blocks mounting plate of claim 1 further comprising:
   at least one score line in the mounting plate wherein the score line is breakable upon a sufficient force to separate the mounting plate into a first section and a second section.

5. A system comprising the building blocks mounting plate of claim 1 comprising:
   a surface; and
   the building blocks mounting plate of claim 1 adhered to the surface via the adhesive after removal of the peelable cover.

6. A method of using the building blocks mounting plate of claim 1 comprising the steps of:
   peeling the cover from the adhesive on the second surface; and
   pressing the adhesive to a surface adhering the adhesive to the surface.

7. A system for holding building blocks comprising:
   a vertical surface;
   at least one building blocks mounting plate comprising a first surface comprising a first plurality of protrusions configured to mount building blocks thereto, wherein the building blocks comprise first crevices on at least one side thereof configured to mount between at least two of the first plurality of protrusions on the mounting plate, wherein the mounting plate further comprises a second surface on a second side of the mounting plate comprising a surface texture comprising second crevices, the mounting plate further comprising an adhesive disposed on the second surface of the mounting plate, wherein the adhesive is applied as a flowable material onto the second surface and disposed within the crevices of the second surface, wherein the building blocks mounting plate is adhered to the vertical surface; and
   a storage receptacle having a storage area and a back surface, wherein the back surface comprises an adhesive thereon, wherein the back surface of the storage receptacle is adhered to the vertical surface in close proximity to the at least one building blocks mounting plate.

8. The system of claim 7 wherein the storage receptacle comprises a front side and a back side, wherein the back surface is on the back side thereof.

9. The system of claim 8 wherein the storage area is semi-cylindrical.

10. The system of claim 7 wherein the storage receptacle is a bucket.

11. The system of claim 7 wherein the storage receptacle is disposed beneath the at least one building blocks mounting plate.

12. The system of claim 7 comprising a second building blocks mounting plate disposed adjacent the at least one building blocks mounting plate.

13. The system of claim 7 wherein the storage receptacle comprises a plurality of building blocks for mounting on the building blocks mounting plate.

* * * * *